H. A. BENEDICT AND E. M. MOLLER.

CONTROL SYSTEM AND APPARATUS.

APPLICATION FILED NOV. 4, 1921.

Reissued Nov. 7, 1922.

15,485.

3 SHEETS—SHEET 1.

WITNESSES:

H. B. Funk.

W. R. Coley

INVENTORS

Hershel A. Benedict

Edward M. Moller.

BY

Wesley G. Carr

ATTORNEY

H. A. BENEDICT AND E. M. MOLLER.

CONTROL SYSTEM AND APPARATUS.

APPLICATION FILED NOV. 4, 1921.

Reissued Nov. 7, 1922. 15,485.

3 SHEETS—SHEET 2.

WITNESSES:
T. H. Cock
W. R. Coley

INVENTOR
Hershel A. Benedict &
Edward M. Moller.
BY
Wesley G. Carr
ATTORNEY

H. A. BENEDICT AND E. M. MOLLER.

CONTROL SYSTEM AND APPARATUS.

APPLICATION FILED NOV. 4, 1921.

Reissued Nov. 7, 1922. 15,485.

3 SHEETS—SHEET 3.

WITNESSES:

H. B. Funk.

W. R. Coley

INVENTORS

Hershel A. Benedict &

Edward M. Moller.

BY

Wesley G. Carr

ATTORNEY

Reissued Nov. 7, 1922. Re. 15,485

UNITED STATES PATENT OFFICE.

HERSHEL A. BENEDICT, OF EAST ORANGE, AND EDVARD M. MOLLER, OF JERSEY CITY, NEW JERSEY.

CONTROL SYSTEM AND APPARATUS.

Original No. 1,373,400, dated April 5, 1921, Serial No. 376,316, filed April 24, 1920. Application for reissue filed November 4, 1921. Serial No. 512,924.

*To all whom it may concern:*

Be it known that we, HERSHEL A. BENEDICT, a citizen of the United States, and a resident of East Orange, in the county of Essex and State of New Jersey, and EDVARD M. MOLLER, a citizen of the United States, and a resident of Jersey City, in the county of Hudson and State of New Jersey, have invented a new and useful Improvement in Control Systems and Apparatus, of which the following is a specification.

This invention relates, generally, to improvements in railway cars, and especially to improvements in electric street-railway cars; and, the present invention has reference, more particularly, to a novel door-operating and controlling mechanism for automatically opening and closing the platform-doors of the car, said mechanism being operated by means of the usual air-compressor which is mounted upon the framework of the car, the air from the compressor being under control of the motorman by a foot-operated air valve upon the operating or releasing plunger on which the motorman has his foot, while the car is running.

The present invention, therefore, has for its principal object to provide a novel door-opening and closing means for street-railway cars, busses, and the like, which is operated from the air compressor, as above stated, for stopping the car and opening the platform-door or doors and for closing and locking the door or doors and starting the car, which door or doors are automatically closed, and must so be closed, before the car can be started.

Other objects of the present invention, not at this time more particularly enumerated, will be clearly understood from the following detailed description of the present invention.

With the various objects of the present invention in view, the said invention consists, primarily, in a novel control and air-brake system for controlling the movements and locking the platform-door or doors of street-railway cars, busses, and the like; and, the present invention consists, furthermore, in the novel arrangements and combinations of the several devices and parts, all of which will be more particularly set forth in the following specification and then finally embodied in the clauses of the claims which are appended to and which form an essential part of the said specification.

The invention is clearly illustrated in the accompanying drawings, in which.

Figure 4:
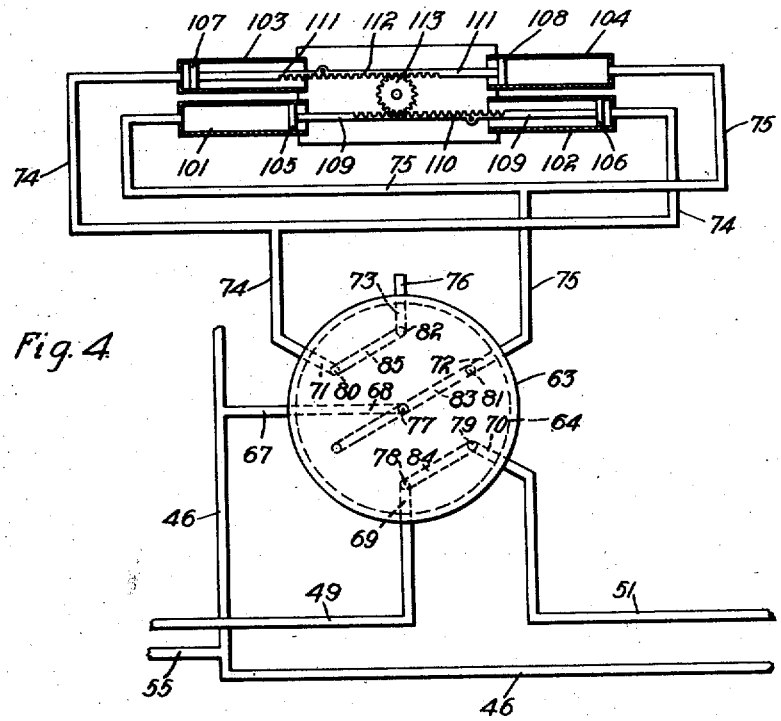
Figure 5:
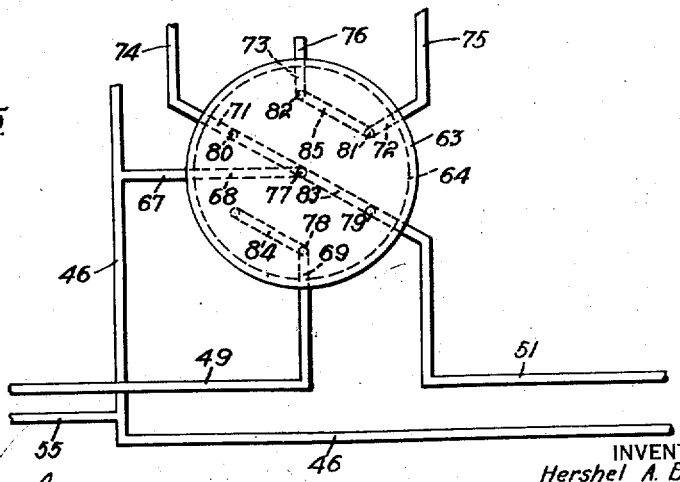

Fig. 4 is a diagrammatic representation of the door-operating mechanism or engine, the foot-controlled air-valve and certain portions of the air-conveying pipes, said view illustrating more particularly the relative positions of the air ducts within the valve of said pipes while running the car and when the door or doors are held in their closed or locked position; and Fig. 5 is a similar representation of the air-valve, showing the relative positions of the air-ducts, within the valve, when the motorman has removed his foot from the foot-lever or plunger of the valve, so as to stop the car and simultaneously opening the door or doors.

Similar characters of reference are employed in the said above-described views, to indicate corresponding parts.

Figure 1:
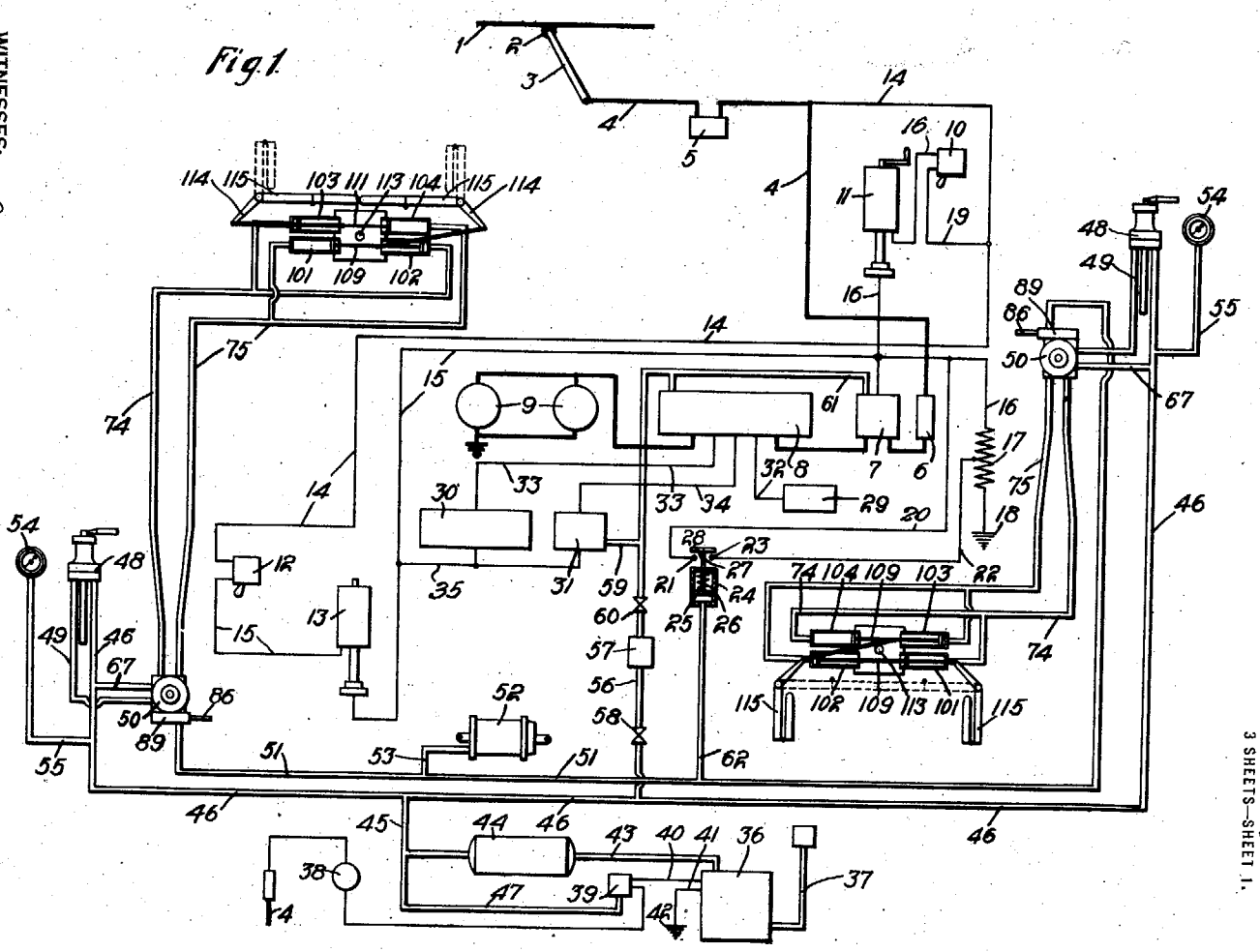
Figure 1 is a control and air-brake diagram for opening and closing the platform-door or doors, of a street railway car, bus, or the like, said diagrammatic representation of devices and parts illustrating one embodiment of the principles of the present invention.

Referring now more particularly to Fig. 1 of the drawings, in which is shown diagrammatically a general arrangement of electrical instrumentalities for starting and operating the car and a similar arrangement of pneumatic instrumentalities for "braking" the car, and also novel means for opening and closing the platform-door or doors and, at the same time, controlling the stopping and starting movements of the car, the reference character 1 indicates the main trolley-wire, with which is in rolling contact any usual construction of trolley-wheel as 2, carried by a pole 3 with which is connected, in the usual manner, a main-circuit conductor 4.

Inserted in this circuit, in the usual and well-known manner, are a fuse-box 5, a main switch 6, a line switch 7, a switch-group 8 and the usual electric motor or motors 9, 9. In the accompanying diagram, as represented in Fig. 1, the system is shown as used with the two end-platforms of a car, so that the car can be operated from either end, and, in that case, a control switch 10 and a controller 11 are located upon one platform, while a control-switch 12 and a controller 13 are positioned upon the other platform of the car.

Connected with the main conductor 4, is an auxiliary conductor 14, leading to the control switch 12, while, extending from said control switch 12, are conductors 15, with which is connected the previously mentioned controller 13. One of the conductors 15 is connected through a conductor 16, to a control resistor 17 which is grounded, as at 18, to provide a complete circuit.

Also connected with the main conductor 4 is an auxiliary conductor 19 leading to the control switch 10, and extending from said control switch 10 is the above-mentioned conductor 16 with which is connected the previously-mentioned controller 11 through which the circuit is completed to the control resistor 17 and the ground 18, as will be clearly understood. Leading from one of the conductors 15 is a conductor 20 which terminates in a contact member 21, while, connected with the control resistor 17, is a motor-control conductor 22 attached, at its opposite end, to a contact member 23.

A pneumatic relay comprises a cylinder 24 in which is disposed a piston or plunger 25 that is biased by a spring 26 to cause a member 27, carried by the piston rod 28, to make contact with the stationary contact members 21 and 23. In connection with the electrical instrumentalities and the electrical circuits hereinabove described, we have shown the arrangement of the usual starting resistor 29, the sequence switch 30, and the reverser 31, as well as the arrangement of the conductor 32, leading from the switch-group 8 to the resistor 29, the conductor 33 leading from the switch-group 8 to the sequence switch 30, and the conductor 34 leading from the switch-group 8 to the reverser 31, the electrical circuit being completed from one of the conductors 15 with the sequence switch 30 and the reverser 31 by means of the conductor 35, as indicated in Fig. 1.

Having, in the foregoing in a general manner, set forth the general arrangement of the electrical instrumentalities, we will now set forth the general arrangement of the pneumatic instrumentalities and their pipe-connections.

An air-compressor 36 is provided with an air-intake 37 and is electrically operated, from the main conductor 4, by means of a switch 38 and an electric governor 39, a conductor 40 leading to the mechanism of the air-compressor 36, and a conductor 41, which is grounded as at 42, completing the power-serving circuit for the air compressor. Connected with, and leading from, the air-compressor 36 is a pipe 43 for conveying and forcing the compressed air into the air-receiving tank or reservoir 44. Leading out of said reservoir 44 is a pipe 45 with which is connected the main line of piping 46, termed the reservoir line. The governor 39 is controlled by the air-pressure within the tank or reservoir 44 through a pipe 47 placed between the pipe 45 and the governor 39, as shown.

Connected with the respective ends of the piping 46 are the usual brake-valves, as 48. Air-conveying pipes 49 are connected to suitably constructed foot-valves 50 through which the compressed air is adapted to be passed into a line of pipe 51, known as the train line, for actuating the brake-mechanism of the usual brake cylinders 52, connected with said train line by the piping 53. Air gages 54 may be connected to a reservoir line 46 by the pipes 55, in the manner shown.

Connected with, and leading from, the reservoir line 46 is a pipe 56 which is connected to a control-reservoir 57, and a cut-out cock 58 is located in the pipe 56. Leading from said control-reservoir 57 is a pipe 59 in which may be placed a strainer 60 for conveying the compressed air to the mechanism of the reverser 31. Furthermore, there is connected with said pipe 59 another pipe 61 for conveying the compressed air to the mechanism of the switch-group 8 and the line switch 7, in a manner as indicated in Fig. 1. To pneumatically operate the piston or plunger 25 of the hereinbefore mentioned pneumatic relay, so as to break the electrical circuit between the contacts 21 and 23 and the member 27 carried by the piston rod 28, an air-conveying pipe 62 is disposed between the train line 51 and the end of the cylinder 24 of the pneumatic relay, as shown.

Referring now more particularly to Figs. 2 to 5, inclusive, each previously mentioned foot-valve 50 comprises a suitably formed shell or casing, as 63, in the cylindrically formed valve-chamber of which is oscillatorily disposed a valve-disk or member, as 64, mounted upon the spindle 65 having its respective ends journalled in suitably formed bearing portions or members 66. Pipes 67 also connect the reservoir line 46 with an inlet to each shell of casing 63, for the purpose to be presently set forth.

As indicated in the diagrammatic views represented in said Figs. 4 and 5 of the drawings, the fixed or stationary portion of each shell or casing 63 is provided with an arrangement of ducts, as 68, 69, 70, 71, 72 and 73, the pipe 67 being connected to the duct 68, pipe 49 to the duct 69, and pipe 51 to the duct 70. Similarly, the duct 71 is connected to a pipe 74, duct 72 to a pipe 75, and duct 73 to a pipe 76, all for the purposes to be presently more fully described.

In communication with the respective stationary or fixed ducts 68, 69, 70, 71, 72 and 73, are connecting duct-portions 77, 78, 79, 80, 81 and 82, said duct-portions being adapted to establish communication with ducts 83, 84 and 85 in the valve disk 64, as represented in either Fig. 4 or Fig. 5 of the drawings.

One means of oscillating the valve-disk 64 to establish communication between the respective ducts, as shown in Fig. 4 or in Fig. 5, is by means of a foot-lever or pedal, as 86, which is mounted, as at 87, upon a pivot-pin 88, extending across a portion 89 of the shell or casing 63. The said portion is also provided with a pin or stud 90, and attached to that part of said stud within said portion 89 is one end of a spring 91, said spring being also attached, at its other end, to the part 87 of the foot-lever or pedal 86. Pivotally connected to a portion 92 of said lever or pedal 86, which is movably disposed in an opening, as 100, in said portion 89, by means of a pintle 93, is a link 94, said link being operatively connected, at its end portion 95, to a connection or pin 96, which is disposed between a bifurcated end portion 98 of a suitably formed crank, as 97, said crank being suitably connected, by means of a socket-portion 99, to the end of the spindle 65.

Figure 2:
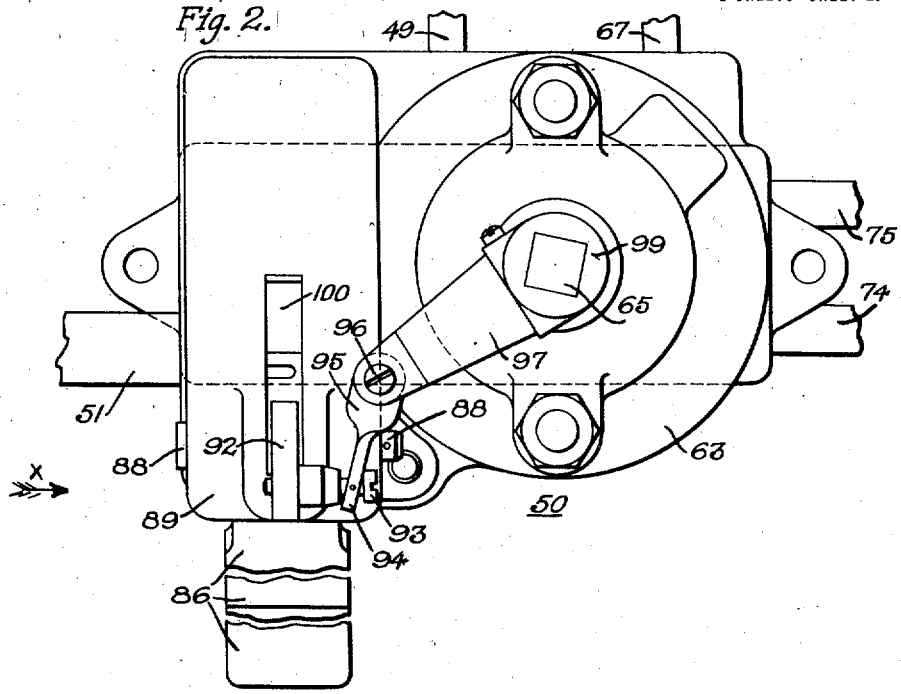
Fig. 2 is a plan view and Fig. 3 an elevation, looking in the direction of the arrow X in Fig. 2, of a foot-operated air-valve used with the door-control and air-brake system.
Figure 3:
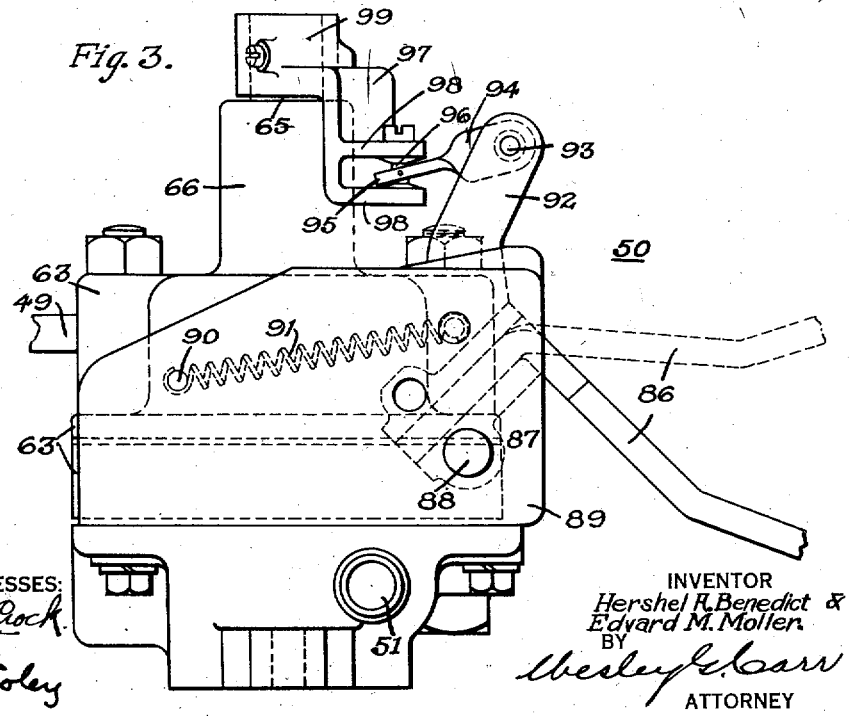

From an inspection of Figs. 2 and 3, it will be seen that the reciprocatory movements of the foot-lever or pedal vertically, by means of the above-described elements, are transformed into reciprocatory movements horizontally of the crank 97, so that the downward position of the lever or pedal 86, when depressed by the foot of the motorman, causes the valve-disk 64 and the various ducts to assume the relative positions indicated in Fig. 4 of the drawings; but, when the foot pressure is removed from the lever or pedal 86, the spring 91 causes the lever or pedal to assume the dotted position indicated in Fig. 3, and thus causes the valve disk 64 and the various ducts to assume the relative positions represented in Fig. 5 of the drawings.

The door-operating mechanism for pneumatically opening and closing the platform-doors of the car is diagrammatically illustrated in Figs. 1 and 4 of the drawings, and one embodiment of the same is an arrangement of four cylinders 101, 102, 103 and 104, respectively provided with pistons or plungers 105, 106, 107 and 108. As shown, these cylinders are arranged in pairs, the cylinder 101 being opposite the cylinder 102, and the cylinder 103 being opposite the cylinder 104. The pistons 105 and 106 are interconnected by connecting rod 109 that is provided with a rack portion 110, and the pistons 107 and 108 are likewise interconnected by a connecting rod 111, also provided with a rack portion 112, the two rack portions being in mesh with the teeth of a pinion 113 constituting part of the mechanism for actuating the link connections 114, or other mechanisms, for opening and closing the usual car door 115.

Having, in the foregoing description, set forth the general arrangements and combinations of devices and parts for locking the doors in their closed relation before the car or bus can be operated, and after the doors have closed permitting the operation of the car; and, furthermore, for opening the doors automatically after the car has been started, we will now briefly set forth the manner of producing these results.

Let us suppose that the car is about to be started and that the doors are in their open positions. One method of operation is as follows:

The motorman, just prior to operating the controller 11 or the controller 13, to turn on the electric current, depresses the foot-lever or pedal 86 of the corresponding foot valve 50. Immediately, the valve disk 64 is brought into position indicated in Fig. 4 and the compressed air passes from the tank or reservoir 44, through the pipe 45, into the reservoir line or pipe 46, and thence, by means of the pipe 67, through the registering ducts 68, 77, 83, 81 and 72, into and through the piping 75, and thence into the ends of the cylinders 101 and 104, so that the pistons 105 and 108 are moved forward into the positions shown in said Fig. 4, whereby the doors are positively closed, the previously intaken air in the cylinders 102 and 103 being exhausted through the piping 74, the registering ducts 71, 80, 85, 82 and 73, into and from the exhaust pipe 76.

At the same time, the motorman, by operating and closing the brake valve 48, shuts off the air pressure through the pipes 49 and 51, thus removing any air pressure against the piston 25 and the relay cylinder 24, whereupon the spring 26 becomes active, and an electrical contact is established between the bar or member 27 and the contacts 21 and 23. An uninterrupted electric circuit thus being established as soon as the controller 11 or the controller 13 has been moved to any operative position, the car is electrically propelled, in the usual manner.

When it is desired to stop the car, the brake valve 48 is opened so that the compressed air from the line of piping 46 will pass through said valve 48, into the pipe 49 and through the registering valves 69, 78, 84, 79 and 70 (see Fig. 4) into the train line or piping 51, and, by means of the pipe 53, actuating the piston in the brake cylinder 52 to set the brakes; the air pressure, at the same time, by means of the pipe 62, actuating the relay piston 25 to break the electrical circuit through the bar or member 27 and the contacts 21 and 23, thus shutting off the electricity to the propelling or driving mechanism of the car, as will be understood.

The car now having been stopped, the motorman removes his foot from the foot-lever or pedal 86, where upon the spring moves the pedal into the dotted-line position shown in Fig. 3, and whereby the valve disk 64 is rotated into the position indicated in Fig. 5 of the drawings.

The compressed air, coming through the reservoir line or pipe 46 and the pipe 67, passes, through the registering ducts 68, 77, 83, 80 and 71, into the piping 74 and thence into the cylinders 102 and 103, against the pistons 106 and 107, driving the latter forwardly to actuate the door-operating mechanism, thereby moving the doors into their open positions. Simultaneously, the air contained in the cylinders 101 and 104 is caused, by the moving pistons 105 and 108, to be exhausted through the piping 75 and the registering ducts 72, 81, 85, 82 and 73 into and from the exhaust pipe 76.

While the car is stopped, in order that the air may not be shut off from the brake-cylinder 52 and the relay-cylinder 24, communication between the pipes 46 and 67 and 51 is also established through the registering ducts 68, 77, 79 and 70, as will be seen from an inspection of Fig. 5 of the drawings.

To again close the doors and start the car, the first above-stated operation of closing the brake valve 48 and depressing the foot-lever or pedal 86, to bring the valve device 64 once more into the position indicated, is repeated.

A second method of operation under the above-assumed conditions is as follows: The controller 11 or the controller 13, as the case may be, is first placed in an operative position. The corresponding engineer's valve 48 remains or is placed in its normal or "release" position.

Then, by merely depressing the foot-valve 50, all three desired operations may be accomplished: The doors will be closed in accordance with the piping arrangements and operations already described, the brakes will be released by exhaust of the air pressure from train-line pipe 51 through the foot-valve to pipe 49 and thence through the engineer's valve 48, while the electric circuit will be closed, since pressure will be released from the pneumatic relay cylinder 24 through the pipes 51 and 49 also.

Furthermore, upon release of the foot-valve by the motorman, the three reverse control operations are automatically accomplished: The electrical circuit is opened by reason of the application of air pressure to the pneumatic relay, the air-brakes are applied in the usual manner and the doors are opened, as previously explained.

Of course we are fully aware that changes may be made in the general arrangements and combinations of the various devices and parts, and especially in the details of the construction of the said parts, without departing from the scope of the present invention as set forth in the foregoing specification, and as defined in the claims which are appended to the said specification. Hence, we do not limit our invention to the exact arrangements and combinations of the various devices and parts as described in the said specification, nor do we confine ourselves to the exact details of the construction of the said parts, as illustrated in the accompanying drawings.

We claim as our invention:

1. In combination with an electric system for operating cars, or the like, a make and break means in said system, a pneumatic system for actuating said make and break means, and a pneumatically controlled door-operating mechanism connected and co-operating with said pneumatic system, primarily for maintaining a locked arrangement of the car-door or doors while the car is running, and secondarily for opening the car-door or doors when the car has stopped.

2. In combination with an electric system for operating cars, or the like, a make and break means in said system, a pneumatic system for actuating said make and break means, a pneumatically controlled door-operating mechanism, and a valve located in said pneumatic system for directing the flow of the air in said pneumatic system, primarily for maintaining a locked arrangement of the car-door or doors while the car is running, and secondarily for opening the car-door or doors when the car has stopped.

3. In combination with an electric system for operating cars, or the like, a make and break means in said system, a pneumatic system for actuating said make and break means, a pneumatically controlled door-operating mechanism, and a foot-operated rotary valve located in said pneumatic system for directing the flow of the air in said pneumatic system, primarily for maintaining a locked arrangement of the car-door or doors while the car is running, and secondarily for opening the car-door or doors when the car has stopped.

4. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with said reservoir, a train-line leading to and connected with said cylinder, a control-valve with which said reservoir and train lines are connected, a door-operating mechanism, and an air-conveying means between said control-valve and the said door-operating mechanism.

5. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with said reservoir, a train-line leading to and connected with said cylinder, a control-valve with which said reservoir and train lines are connected, a door-operating mechanism, comprising a plurality of cylinders arranged in pairs, the pistons of each pair of cylinders being interconnected by a single connecting rod, means actuated from said rods for operating the doors of the car, and air-conveying pipes leading from said control-valve and connected with the respective cylinders for actuating said pistons.

6. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with said reservoir, a train-line leading to, and connected with said cylinder, a control-valve with which said reservoir and train lines are connected, comprising a valve-casing, a rotary valve-disk within said casing, a foot-lever for operating said valve-disk, a door-operating mechanism, and an air-conveying means between the casing of said control-valve and the said door-operating mechanism, said valve disk being provided with a plurality of ducts adapted to establish communication with said reservoir and train lines and also with the air-conveying means of said door-operating mechanism.

7. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with said reservoir, a train line leading to and connected with said cylinder, a control-valve with which said reservoir and train-lines are connected, comprising a valve casing, a rotary valve-disk within said casing, a foot lever for operating said valve-disk, a door-operating mechanism, comprising a plurality of cylinders arranged in pairs, the pistons of each pair of cylinders being interconnected by a single connecting rod, means actuated from said rods for operating the doors of the car, and air-conveying pipes leading from said control-valve and connected with the respective cylinders for actuating said pistons, said valve-disks being provided with a plurality of ducts adapted to establish communication with said reservoir and train-lines and also with the air-conveying pipes leading from said control-valve to the cylinders of said door-operating mechanism.

8. In combination with an electric sustem for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with and leading from said reservoir, a train-line leading to and connected with said cylinder, a brake-valve mechanism connected with said reservoir line, an air-conveying means leading from the said brake-valve mechanism, a control-valve with which said air-conveying means and the said train-line are connected, a door-operating mechanism, and an air-conveying means between said control-valve and the said door-operating mechanism.

9. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with and leading from said reservoir, a train-line leading to and connected with said cylinder, a brake-valve mechanism connected with said reservoir line, an air-conveying means leading from said brake-valve mechanism, a control-valve with which said air-conveying means and the said train-line are connected, a door-operating mechanism, comprising a plurality of cylinders arranged in pairs, the pistons of each pair of cylinders being interconnected by a single connecting rod, means actuated from said rod for operating the doors of the car, and air-conveying pipes leading from said control-valve and connected with the respective cylinders for actuating said pistons.

10. In combination with an electric system for operating cars, or the like, a make and break means in said system comprising a cylinder, a spring-controlled piston within said cylinder, a pneumatic system for actuating ssaid piston, said pneumatic system comprising an air-compressor and an air-receiving reservoir, a reservoir line connected with and leading from said reservoir, a train-line leading to and connected with said reservoir line, an air-conveying means leading from said brake-valve mechanism, a control-valve with which said air-conveying means and the said train-line are connected, comprising a valve-casing, a rotary valve-disk within said casing, a foot lever for operating said valve-disk, a door-operating mechanism, and an air-conveying means between said control-valve and the said door-operating mechanism, said valve-disk being provided with a plurality of ducts adapted to establish communication with the air-conveying means leading from said brake-valve mechanism and with said train-line, and also with the air-conveying means of said door-operating mechanism.

11. In combination with an electric system for operating cars, or the like, a make and break means in said system comprising a cylinder, a spring-controlled piston within said cylinder, a pneumatic system for actuating said piston, said pneumatic system comprising an air-compressor and an air-receiving reservoir, a reservoir line connected with and leading from said reservoir, a train-line leading to and connected with said cylinder, a brake-valve mechanism connected with said reservoir line, an air-conveying means leading from the said brake-valve mechanism, a control-valve with which said air-conveying means and the said train-line are connected, comprising a valve casing, a rotary valve disk within said casing, a foot lever for operating said valve disk, a door-operating mechanism, comprising a plurality of cylinders arranged in pairs, the pistons of each pair of cylinders being interconnected by a single connecting rod, means actuated from said rods for operating the doors of the car, and air-conveying pipes leading from said control-valve and connected with the respective cylinders for actuating said pistons, said valve-disk being provided with a plurality of ducts adapted to establish communication with the air-conveying means leading from said brake-valve mechanism, and with said train-line, and also with the air-conveying pipes leading from said control-valve to the cylinders of the door-operating mechanism.

12. In combination with the air-brake control of a car, a door-operating mechanism, a foot-operated control valve comprising a part of and connected with said air-brake control, a door-operating mechanism, and an air-conveying means between said control-valve and said door-operating mechanism for actuating the same.

13. In combination with the air-brake control of a car, a door-operating mechanism, a valve-casing, a rotary valve-disk within said casing, a foot-lever for operating said valve disk, a door-operating mechanism, and means between the casing of said control-valve and the said door-operating mechanism for actuating the same.

14. In combination with the air-brake control of a car, a door-operating mechanism, a valve-casing, a rotary valve-disk within said casing, a foot-lever for operating said valve-disk, a door-operating mechanism, comprising a plurality of cylinders arranged in pairs, the pistons of each pair of cylinders being interconnected by a single-connecting rod, means actuated from said rods for operating the doors of the car, and air-conveying pipes leading from said control-valve and connected with the respective cylinders for actuating the pistons of said cylinders.

15. In a vehicle, the combination with a dynamo-electric machine, a car brake and a car door, of foot-operated means for pneumatically governing the operations of said machine, brake and door.

16. In a vehicle, the combination with a dynamo-electric machine, a car brake and a car door, of foot-operated means for directly controlling said brake and said door and indirectly controlling said machine.

17. In a vehicle, the combination with a dynamo-electric machine, a car brake and a car door, of foot-operated means for pneumatically controlling said brake and said door directly and a relay device governed by said means for controlling said machine.

18. In a vehicle, the combination with a dynamo-electric machine, a car brake and a car door, of foot-operated means for pneumatically controlling said brake and said door directly and a relay device pneumatically governed by said means for controlling said machine.

19. In a vehicle, the combination with a dynamo-electric machine, a car brake and a car door, of foot-operated means for pneumatically controlling said brake and said door directly, a remote-control circuit for said machine and a relay device governed by said means for opening and closing said circuit.

20. In a vehicle, the combination with a dynamo-electric machine, a car brake and a car door, of foot-operated means for pneumatically controlling said brake and said door directly, a remote-control circuit for said machine and a relay device pneumatically governed by said means for opening and closing said circuit.

21. In a vehicle, the combination with a dynamo-electric machine, a car brake and a car door, of foot-operated means for pneumatically governing the operations of said machine, brake and door, said means being biased to effect opening of the machine circuit and of said door and setting of said brake.

22. In a vehicle, the combination with a dynamo-electric machine, a car brake and a car door, of foot-operated means for directly controlling said brake and said door and indirectly controlling said machine, said means being biased toward a position corresponding to inoperativeness of said machine, application of said brake and opening of said door.

23. In a vehicle, the combination with a dynamo-electric machine, a car brake and a car door, of foot-operated means for pneumatically controlling said brake and said door directly and a relay device governed by said means for controlling said machine, said means being biased toward a position corresponding to inoperativeness of said machine, application of said brake and opening of said door.

24. In a vehicle, the combination with a dynamo-electric machine, a car brake and a car door, of foot-operated means for pneumatically controlling said brake and said door directly, a remote-control circuit for said machine and a relay device governed by said means for opening and closing said circuit, said means being biased toward a position corresponding to inoperativeness of said machine, application of said brake and opening of said door.

25. In a vehicle, the combination with a dynamo-electric machine, a car brake and a car door, of a single manually-operable device for concurrently governing said machine and said brake, and independent foot-operated means for controlling said door.

26. In a vehicle, the combination with a dynamo-electric machine and a car brake, of a single device for pneumatically governing the operations of said machine and said brake, and a source of fluid pressure normally maintained ineffective by said device.

27. In a vehicle, the combination with a dynamo-electric machine and a car brake, of manually operable means for pneumatically governing the operation of said brake and a relay device pneumatically actuated by said means for governing the operation of said machine when said brake is inoperative.

28. In a vehicle, the combination with a dynamo-electric machine and a car brake, of manually operable means for pneumatically governing the operation of said brake, a controller for governing the operation of said machine and means pneumatically controlled by said manual means when said brake is inoperative for rendering said controller operative.

29. In a vehicle, the combination with a dynamo-electric machine and a car brake, of manually operable means for pneumatically governing the operation of said brake, a controller for governing the operation of said machine and a relay device biased to a closed position and pneumatically released by said manual means for rendering said controller operative.

30. In a vehicle, the combination with a dynamo-electric machine and a car door, of means for selectively effecting the operation of said door alone or of both said machine and said door.

31. In a vehicle, the combination with a car brake and a car door, of means for selectively effecting the operation of said door alone or of both said brake and said door.

32. In a vehicle, the combination with a dynamo-electric machine and a car door, of foot-operated means for selectively effecting the operation of said door alone or of both said machine and said door.

33. In a vehicle, the combination with a car brake and a car door, of foot-operated means for selectively effecting the operation of said door alone or of both said brake and said door.

34. In a vehicle, the combination with a dynamo-electric machine and a car door, of means for pneumatically and selectively effecting the operation of said door alone or of both said machine and said door.

35. In a vehicle, the combination with a car brake and a car door, of unitary means for pneumatically and selectively effecting the operation of said door alone or of both said brake and said door.

36. In a vehicle, the combination with a dynamo-electric machine and a car door, of a foot-valve located on a car platform for selectively effecting the operation of said door alone or of both said machine and said door.

37. In a vehicle, the combination with a car brake and a car door, of a foot-valve located on a car platform for selectively effecting the operation of said door alone or of both said brake and said door.

38. In a vehicle, the combination with a dynamo-electric machine, a car brake and a car door, of unitary means for selectively effecting the operation of said door alone or of said machine, said brake and said door concurrently.

39. In a vehicle, the combination with a dynamo-electric machine, a car brake and a car door, of foot-operated means for selectively effecting the operation of said door alone or of said machine, said brake and said door concurrently.

40. In a vehicle, the combination with a dynamo-electric machine, a car brake and a car door, of single means for pneumatically and selectively effecting the operation of said door alone or of said machine, said brake and said door concurrently.

41. In a vehicle, the combination with a dynamo-electric machine, a car brake and a car door, of a foot-valve located on a car platform for selectively effecting the operation of said door alone or of said machine, said brake and said door concurrently.

42. In a vehicle, the combination with a dynamo-electric machine and a car door, of unitary means for selectively effecting the operation of said door alone or the concurrent opening of the machine circuit and the door.

43. In a vehicle, the combination with a car brake and a car door, of single means for selectively effecting the operation of said door alone or the concurrent application of said brake and opening of said door.

44. In a vehicle, the combination with a dynamo-electric machine and a car door, of foot-operated means for selectively effecting the operation of said door alone or the concurrent opening of the machine circuit and the door.

45. In a vehicle, the combination with a car brake, and a car door, of foot-operated means for selectively effecting the operation of said door alone or the concurrent application of said brake and opening of said door.

46. In a vehicle, the combination with a dynamo-electric machine and a car door, of means for pneumatically and selectively effecting the operation of said door alone or the concurrent opening of the machine circuit and of the door.

47. In a vehicle, the combination with a car brake and a car door, of means for pneumatically and selectively effecting the operation of said door alone or the concurrent application of said brake and opening of said door.

48. In a vehicle, the combination with a dynamo-electric machine and a car door, of a foot-valve located on a car platform for selectively effecting the operation of said door alone or the concurrent opening of the machine circuit and said door.

49. In a vehicle, the combination with a car brake and a car door, of a foot-valve located on a car platform for selectively effecting the operation of said door alone or the concurrent application of said brake and opening of said door.

50. In a vehicle, the combination with a dynamo-electric machine, a car brake and a car door, of means for selectively effecting the operation of said door alone or of concurrently opening the machine circuit and said door and applying said brake.

51. In a vehicle, the combination with a dynamo-electric machine, a car brake and a car door, of foot-operated means for selectively effecting the operation of said door alone or of concurrently opening the machine circuit and said door and applying said brake.

52. In a vehicle, the combination with a dynamo-electric machine, a car brake and a car door, of means for pneumatically and selectively effecting the operation of said door alone or the concurrent opening of the machine circuit and said door and the application of said brake.

53. In a vehicle, the combination with a dynamo-electric machine, a car brake and a car door, of a foot-valve located on a car platform for selectively effecting the operation of said door alone or concurrently opening the machine circuit and said door and applying said brake.

54. In a vehicle, the combination with a dynamo-electric machine and a car door, of a foot-valve located on a car platform for selectively effecting the operation of said door alone and of both said machine and said door, said valve being biased to effect the latter operation.

55. In a vehicle, the combination with a car brake and a car door, of a foot-valve located on a car platform for selectively effecting the operation of said door alone and of both said brake and said door, said valve being biased to effect the latter operation.

56. In a vehicle, the combination with a dynamo-electric machine, a car brake and a car door, of a foot-valve located on a car platform for selectively effecting the operation of said door alone and of said machine, said brake and said door concurrently, said valve being biased to effect the latter operation.

57. In a vehicle, the combination with a dynamo-electric machine and a car door, of a foot-valve located on a car platform for selectively effecting the operation of said door alone and the concurrent opening of the machine circuit and said door, said valve being biased to effect the latter operation.

58. In a vehicle, the combination with a car brake and a car door, of a foot-valve located on a car platform for selectively effecting the operation of said door alone and the concurrent application of said brake and opening of said door, said valve being biased to effect the latter operation.

59. In a vehicle, the combination with a dynamo-electric machine, a car brake and a car door, of a foot-valve located on a car platform for selectively effecting the operation of said door alone and concurrently opening the machine circuit and said door and applying said brake, said valve being biased to effect the latter operation.

In testimony whereof, we have hereunto subscribed our names this 23rd day of October, 1921.

HERSHEL A. BENEDICT.
EDVARD M. MOLLER.